UNITED STATES PATENT OFFICE.

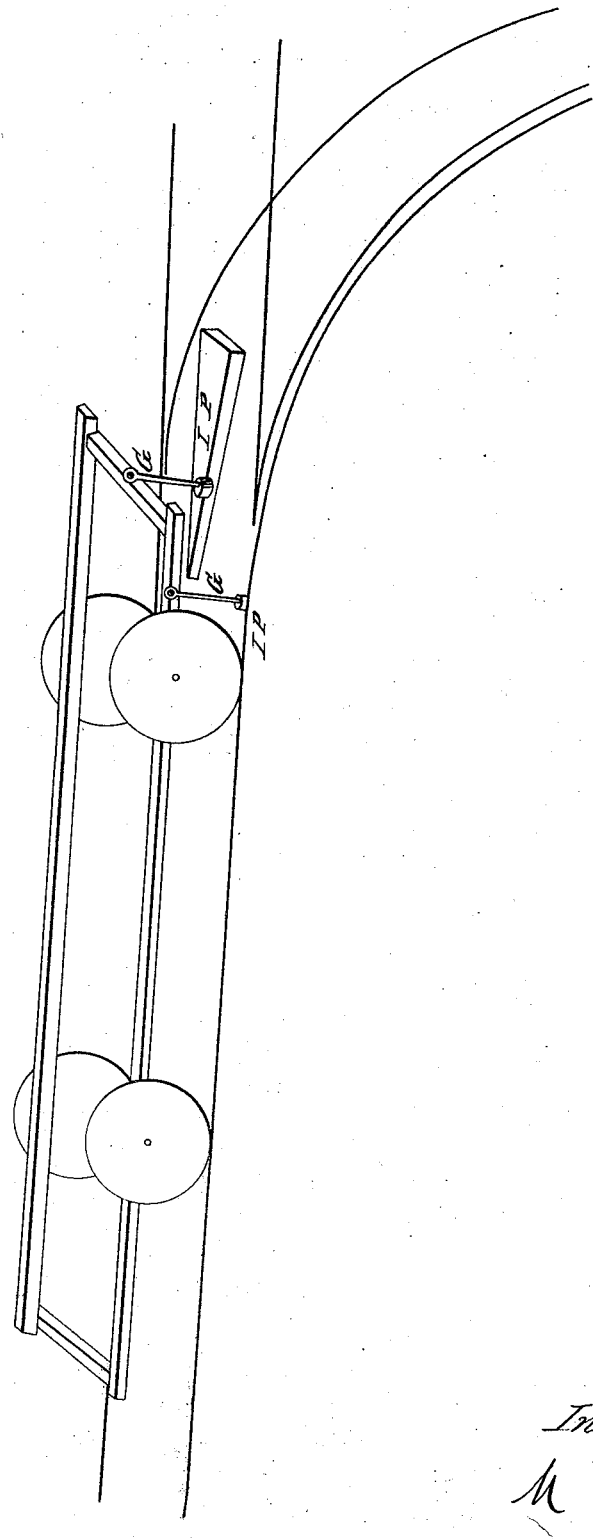

M. SEMPLE, OF PHILADELPHIA, PENNSYLVANIA.

MODE OF SWITCHING OFF RAILROAD-CARS FROM ONE TRACK TO ANOTHER.

Specification of Letters Patent No. 24,336, dated June 7, 1859.

*To all whom it may concern:*

Be it known that I, M. SEMPLE, of Philadelphia, in the county of Philadelphia, in the State of Pennsylvania, have invented a new and Improved Mode of Switching or Turning Cars from One Track to Another, reference being had to the accompanying drawings and to the letters of reference marked thereon.

The nature of my invention consists in switching the cars on to another track by vertical inclined planes and not by the bearing of the car wheel on the rails alone, as is now done by the movable switch.

To enable others skilled in the art to make and use my invention I will proceed to describe its construction and operation.

I construct the general track as usual on diverging roads except the movable switch, in lieu of which I place a vertical inclined plane ( I, P,) on each outer side of the track rising a little above the plane of the track for about the length of a car, or like vertical inclined planes (I, P,) in the center of the track in like manner slightly above the plane of the track and about the same length as a car, at the same time I apply to the sides of the car guide bars (G) with or without rollers to bear upon and move along the inclined planes at the sides or similar bars (G) under the middle of the car to move along the inclined planes at the center of the track either set of bars being adjustable at pleasure and by which the car is switched from one track to another thus making the switching to be entirely under the control of the conductor and safer than heretofore. I make my guide bars of a solid 1½ or 2 inch round iron bars of a length to reach from the top edge of the platform nearly to the ground the lower end having a roller R 4 to 6 inches in diameter affixed to it so as to move along the wedge shaped inclined planes and as my invention is chiefly adapted to and designed for horsepower city passenger rail roads the cars of which almost always turn the corners of the streets in the same direction the guide bar may be permanently fixed yet in case it be desirable to make different turns or to pass the turnout or switching place then I affix the guide bar to the car so as to move in a groove or within strong staples S allowing a motion up or down but in no other direction and to the top I affix a common treadle T as a lever of the second kind having below it a spring *w* strong enough merely to keep the lever and bar elevated 5 or 6 inches from the ground so that if it be desired the car will keep a straight course and the guide bars being entirely under the control of the driver or conductor by means of the treadle. When the car is required to turn all that is necessary is to press the foot on the treadle by which the roller end of the guide bar is brought into contact with the vertically inclined planes and will bear the car off from the direct to the diverging route. I make the first deviation from the direct line of the road a very slight and rectilinear divergence for the length of a car and after the car is fairly on the new track it may curve according to circumstances and the elevated inclined planes be no longer continued.

What I claim as my invention and desire to secure by Letters Patent, is—

The immovable switch or turnout (I, P,) in combination with the guide bars (G) when arranged and operating substantially as described.

Philadelphia March 1, 1859.

M. SEMPLE.

Witnesses:
C. E. SEMPLE,
JAS. CARROL.